Dec. 12, 1933.  Z. KITAMURA  1,939,122
WINDSHIELD FOR MOTOR CARS AND THE LIKE
Filed Dec. 28, 1932    2 Sheets-Sheet 2
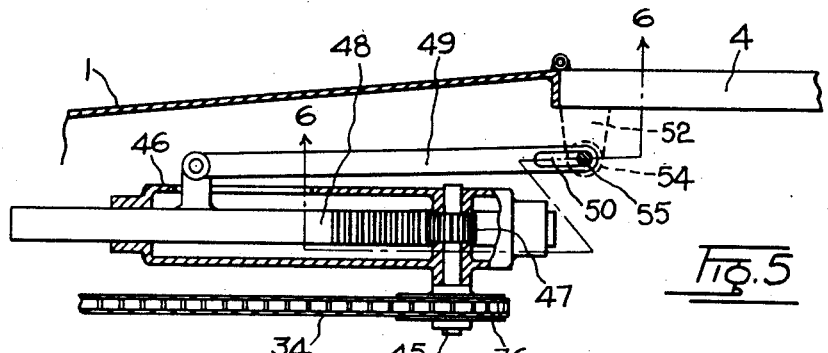
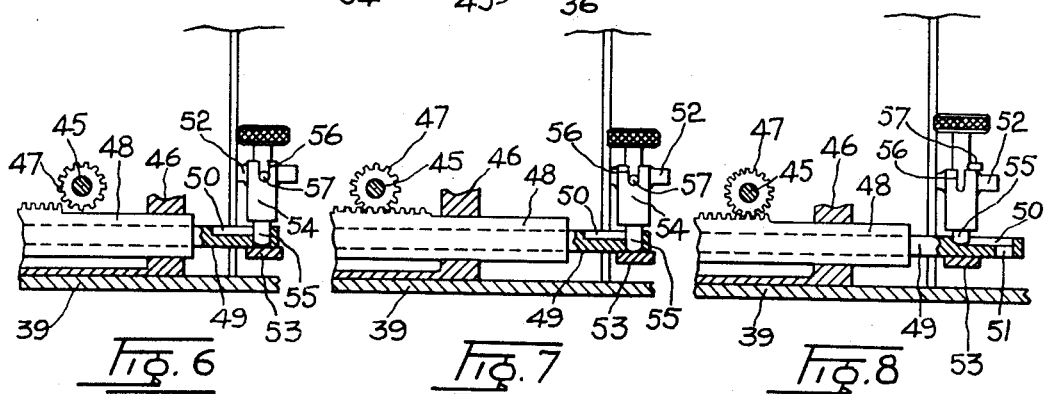
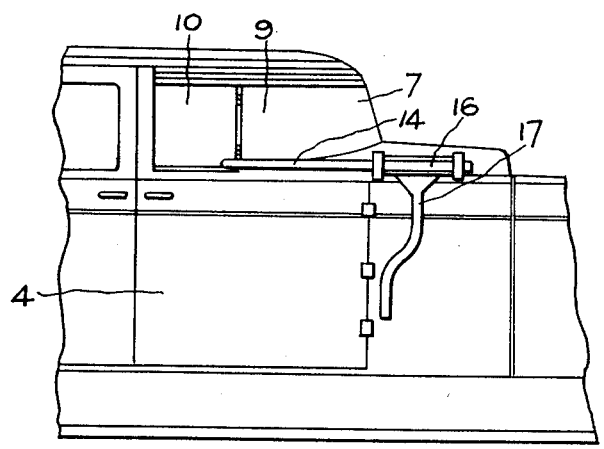
INVENTOR
ZENKURO KITAMURA
BY
Featherstonhaugh & Co
ATTORNEYS Patented Dec. 12, 1933

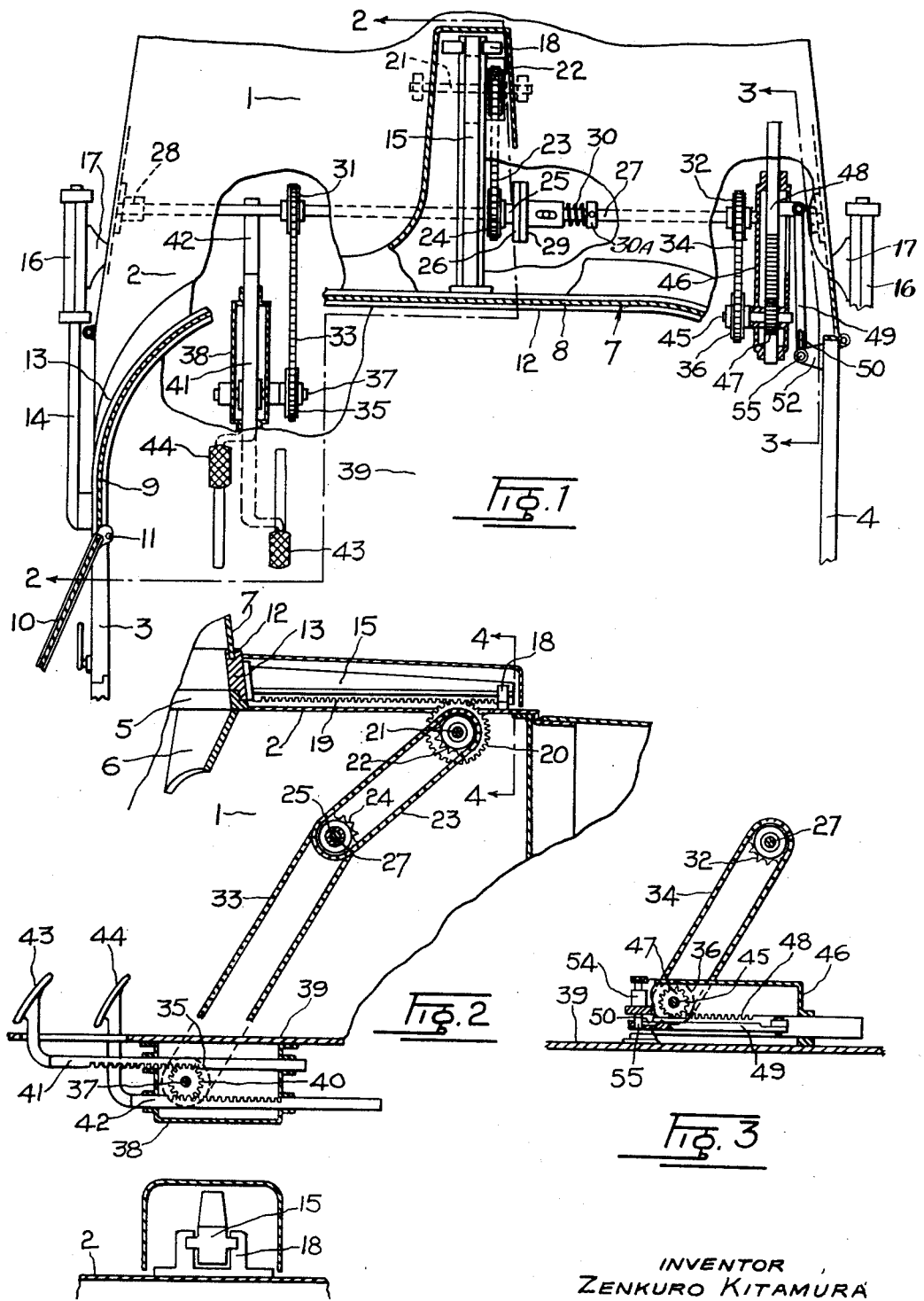

1,939,122

UNITED STATES PATENT OFFICE 1,939,122

WINDSHIELD FOR MOTOR CARS AND THE LIKE

Zenkuro Kitamura, Vancouver, British Columbia, Canada

Application December 28, 1932
Serial No. 649,162

5 Claims. (Cl. 296—84)

My invention relates to improvements in windshields for motor cars and the like. The objects of the invention are to provide a windshield capable of affording a clear view of the road to the front and both sides of the driver whereby said windshield may extend as a single sheet of glass, if desired, from the centre of one front door of the car around the front to a similar position of the opposite door; to provide that the windshield may be opened at will by the driver or the front seat passenger, and to provide means for locking the windshield in closed position simultaneously with the closing and locking of the right hand door.

The invention consists essentially of a curved clear vision windshield mounted to slide forwardly to open, means operable by a lever or foot pedal for controlling said opening and closing movements, and means operable by the door remote from the driver for controlling said opening and closing movements, as will be more fully described in the following specification and shown in the accompanying drawings, in which:—

Fig. 1 is a plan view of the windshield showing the left hand or driver's door and the windshield operating mechanism.

Fig. 2 is a longitudinal sectional view taken on the line 2—2 of Figure 1.

Fig. 3 is a longitudinal sectional view taken on the line 3—3 of Figure 1.

Fig. 4 is a transverse sectional view of the windshield slide and rack taken on the line 4—4 of Figure 2.

Fig. 5 is an enlarged plan view of the door controlled operating rack and connections.

Fig. 6 is a sectional view of said rack taken on the line 6—6 of Figure 5 showing the door closed and the rack so positioned as to allow the windshield to be controlled by the driver.

Fig. 7 is a similar view with the rack being moved to operate the windshield in response to the opening movement of the passenger's door.

Fig. 8 is a similar view with the rack positioned to prevent operation of the windshield except by the opening of said door.

Fig. 9 is a fractional side elevation of the car fitted with the invention.

In the drawings like characters of reference indicate corresponding parts in each figure.

The numeral 1 indicates generally the front portion of a car body in which 2 is the cowl, 3 the driver's door and 4 the opposite or front seat passenger's door.

The numeral 5 indicates the sill extending around the rear edge of the cowl to the forward side of the doors 3 and 4, and 6 the instrument panel. The sill 5 is rounded at each end of the instrument panel to carry about it a similarly curved windshield generally indicated by the numeral 7 which is preferably made of a single sheet of glass extending across the front of the car as at 8 and rearwardly to extend approximately half the width of the doors 3 and 4 and to form wings 9. Hingedly mounted at the free ends of the wings are glass flaps 10 which are capable of being secured in any desired position by a bolt 11 or any other suitable means, these flaps coact with the extremities of the wings 9 of the windshield 7 to serve as glazing for the doors 3 and 4.

The windshield 7 is mounted in a suitable frame 12 having a lower member 13, which is supported upon a pair of slide rods 14 only one of which is shown and a rack 15. The slide rods 14 are mounted in a pair of tubular guides 16 which are supported on brackets 17 secured on opposite sides of the car to the side panels of the cowl 2, and the rack is secured to the centre front of the lower frame member 13 and is slidably mounted in a guide 18 secured upon the apex of the cowl, thus providing a three point suspension. The rack is provided with teeth 19 on its underside which are engaged by a pinion 20 secured upon a suitably journalled shaft 21 extending transversely below the cowl. The shaft 21 is fitted with a chain sprocket 22 and is driven through a chain 23 from a further sprocket 24. The sprocket 24 is mounted upon a sleeve 25 having a clutch plate 26, which sleeve and clutch plate are rotatable upon a shaft 27 mounted in bearings 28 (shown in dotted line in Figure 1) and the plate 26 abuts a corresponding clutch plate 29 which is slidably but non-rotatably mounted upon the shaft and is urged into contact with the plate 26 by means of a spring 30 compressed between the plate 29 and a collar 30A for the purpose of imparting a non-positive drive through the plate 26 to the shaft 21 and its pinion 20.

The shaft 27 is fitted with two chain sprockets 31 and 32 which are respectively driven through chains 33 and 34 from sprockets 35 and 36. The sprocket 35 is secured to a shaft 37 journalled in a casing 38 which is mounted below the floor 39 adjacent the driver's seat, and is fitted with a pinion 40 which is engaged by upper and lower toothed racks 41 and 42 respectively, which racks are provided with foot pedals 43 and 44, so that a forward thrust of the pedal 43 will through its train of gears, sprockets and chains, move the rack 15 in a forward direction and draw the windshield 7 forwardly also and correspondingly a forward thrust of the pedal 44 will through the same train move the windshield rearwardly to close it. It will of course be obvious that a single hand lever could be employed in a position convenient to the driver for imparting rotation to the several shafts to move the windshield in either direction.

The sprocket 36 is secured to a shaft 45 journalled in a casing 46, which shaft has secured to it a pinion 47 which is engaged by a toothed rack 48 having hingedly connected therewith a rod 49. The outer end of the rod 49 is provided with an elongated recess 50, see Figures 1, 5, 6, 7 and 8, and at the outer end of this a bolt hole 51 is formed.

Secured to the inner face of the door adjacent the hinged edge is a bracket 52 having at its base a projecting lip 53 upon which the outer end of the rod 49 is supported and a slide 54 above said lip in which a bolt 55 is slidably movable, the slide is slotted as at 56 to accommodate a pin 57 extending from the bolt which limits the downward movement of the bolt and which serves also to engage the upper face of the slide, when the bolt is raised and turned, to support the bolt in such a position that its lower extremity is freed from the bolt hole 51 and is entered only into the recess 50 and can slide therealong as the passenger's door 4 is swung.

In operating the windshield from the driver's seat with the passenger's door closed, pressure is applied to the foot pedal 43 to move the windshield to open position and to withdraw the wing portions 9 of said windshield from over the doors 3 and 4 and by applying pressure to the foot pedal 44 to move it forwardly, the windshield is moved rearwardly to move the wing portions back over the doors.

It will be noticed that when the door is closed and the bolt 55 is seated in the bolt hole 51 of the rod 49 all the teeth of the rack 48 are disposed beyond the pinion 47, see Figure 6, so that no engagement exists between said pinion and the rack, hence the pinion can be rotated in either direction in response to the operation of the foot pedals 43 and 44.

If the passenger desires to leave the car, he opens his door 4, which action moves the bracket 52 and through its bolt 55 draws the rod 49 rearwardly initially bringing the teeth of the rack 48 into engagement with the pinion 47, thus imparting rotation to it, and through the sprocket 36, the chain 34, the sprockets 32 and 24, the chain 23 and the sprocket 22 imparts rotation to the pinion 20 and the rack 15, which moves the windshield to open it.

If the windshield has been operated by the driver in response to foot pedal movement and left in a partially open position, the opening movement of the door will first bring the rack 48 into engagement with its pinion and then by imparting rotation to it, will cause the windshield to open to its fullest extent and on reaching that position, since the pinion 20 engaging the rack 15 cannot further rotate, the clutch plate 29 will slip upon the coacting plate 26, thus permitting the rack 48 to be drawn rearwardly to its fullest extent in response to the full opening of the door.

When it is desired to lock the windsield, the bolt 55 is raised to the position shown in Figure 8 and turned to prevent its dropping into the hole 51 and to permit it to slide along the recess 50 in the rod 49, so that the closing of the door will cause the bolt to engage the forward end of the recess and will move the rack less than its total stroke and leave the rack in engagement with its pinion thus preventing its rotation, and the free movement of the windshield. The locking of the doors therefore completes the locking of the car against access thereto.

What I claim as my invention is:

1. In a motor car, a windshield extending across the front of the car body and along both sides to points beyond the forward side edges of the front doors, and means adjacent the driver's seat for moving said windshield to afford access to the car through said doors, said windshield operating means comprising a pair of foot pedals adapted to move simultaneously in opposite direction, a rack connected to the windshield, a pinion for imparting endwise movement to the rack and a gear train between the pedals and the pinion to rotate said pinion.

2. In a motor car of the closed type, a windshield extending across the front of the car body and means associated with one of the car doors for opening said windshield simultaneously with the opening of said door, said means being arranged to remain inoperative during the initial opening movement of the door.

3. In a motor car, a windshield extending across the front of the car body and along both sides to points beyond the forward side edges of the front doors, means associated with one of said doors and other means adjacent the driver's seat for moving the windshield to afford access to the car through said doors.

4. In a motor car, a windshield extending across the front of the car body and along both sides to points beyond the forward side edges of the front doors, means associated with one of said doors and other means adjacent the driver's seat for moving the windshield to afford access to the car through said doors, said first named means including a rack and pinion out of engagement with each other when the door is closed and in engagement following the initial opening of said door.

5. In a motor car, a windshield extending across the front of the car body and along both sides to points beyond the forward side edges of the front doors, a gear train for slidingly moving the windshield longitudinally of the car body, means adjacent the driver's seat and other means connected to a door of the car for operating the train of gears, the means connected to the door being operative to move the windshield only after the initial door opening movement and capable of being manually set to render the gear train inoperative when the door is closed.

ZENKURO KITAMURA.